United States Patent [19]

Larkin

[11] 3,715,333

[45] Feb. 6, 1973

[54] POLYVINYLCHLORIDE STABILIZATION WITH MIXTURES OF TIN SALTS

[75] Inventor: William A. Larkin, Morristown, N.J.

[73] Assignee: M & T Chemicals Inc., New York, N.Y.

[22] Filed: Nov. 13, 1969

[21] Appl. No.: 876,599

[52] U.S. Cl. ............................260/45.75 R, 252/407
[51] Int. Cl. ...............................................C08f 45/62
[58] Field of Search..................260/45.75 K; 252/407

[56] References Cited

UNITED STATES PATENTS

| 2,641,588 | 6/1953 | Leistner et al | 260/45.75 |
| 2,798,863 | 7/1957 | Tomka | 760/45.75 |
| 3,440,255 | 4/1969 | Matsuda | 260/45.75 |

Primary Examiner—Donald E. Czaja
Assistant Examiner—Vi Piltoke
Attorney—Lewis C. Brown, Kenneth G. Wheeless and Robert P. Grindle

[57] ABSTRACT

This invention relates to stabilizing compositions; to the process for preparing a novel halogen-containing polymer; and to polymers stabilized against the deteriorative effect of heat which comprises a vinyl chloride or vinylidene chloride homopolymer or copolymer and a stabilizing amount of: as a first stabilizer an organotin halide exhibiting the formula $RSnX_3$ wherein R is a hydrocarbon and X is halogen and as a second stabilizer a sulfur-containing organotin compound exhibiting two direct carbon to tin bonds and two direct sulfur to tin bonds.

6 Claims, No Drawings

POLYVINYLCHLORIDE STABILIZATION WITH MIXTURES OF TIN SALTS

This invention relates to novel stabilized halogen-containing polymer compositions and to a method for stabilizing halogen-containing polymers including polyvinyl chloride.

BACKGROUND OF THE INVENTION

Various halogen-containing organic polymers, particularly vinyl halide polymers which include homopolymers of vinyl chloride and copolymers of vinyl chloride with other monomers, degrade when subjected to heat over an extended period of time as evidenced by darkening of the resin and by an increase in brittleness. These defects may render the resin unsuitable for many uses since the darkening produces an unsightly appearance, and the increased brittleness may cause mechanical failures. A wide variety of materials has heretofore been employed to stabilize halogen-containing polymers. Many of these additives have achieved some measure of success in stabilizing halogen-containing resins against the degradative action of heat, but there are many applications in which a greater degree of heat stability is desired than has heretofore been readily attainable.

It is particularly characteristic of prior art stabilizing systems that they may not fully prevent the deterioration of resins or polymers including polyvinyl chloride during the period when the resins and stabilizer compositions may be maintained on the hot mill on which they are blended. During this period, which may be from 5 to 30 minutes or longer, the various ingredients including e.g. pigment, plasticizer, stabilizer, lubricant, etc., may be mixed with the resin and the mixture subjected to the influence of heat and pressure to form a substantially homogeneous mixture. During this period of severe heating (typically at 175° C. or higher), the resin may deteriorate much more quickly than under normal processing or handling conditions. Thus the product coming from the Banbury Mill-Blender or extruder may be darker than is desirable.

Those skilled in the art have heretofore attempted to eliminate this deterioration resulting from heat by addition of various materials including auxiliary heat stabilizers. It has been found, however, that the presence of these additional materials results in undesirable side effects which may unsatisfactorily modify the desired properties of the resin or polymer. Accordingly, it has heretofore not been possible to prepare resin compositions which may be stabilized in totally satisfactory manner against the deteriorative effect of heat.

It is an object of this invention to provide a method for stabilizing halogen-containing organic polymer or resin compositions, particularly vinyl halide polymers, against heat deterioration. It is a further object of this invention to provide novel stabilized halogen-containing polymers. Other objects will be apparent to those skilled in the art from inspection of the following description.

BRIEF SUMMARY

This invention is a novel stabilizing composition for stabilizing a vinyl chloride homopolymer or copolymer against the deteriorative effects of heat which comprises as a first stabilizer an organotin halide of the formula $RSnX_3$ wherein R is a hydrocarbon and X is chlorine, bromine, or iodine and as a second stabilizer a sulfur-containing organotin compound exhibiting two direct carbon to tin bonds and a direct bond from tin to each of two sulfur atoms.

Among the compounds exhibiting one direct carbon to tin bond and three direct halogen to tin bonds operable in the practice of this invention are those of the formula $RSnX_3$ wherein R is selected from the group consisting of alkyl having one to 20 carbon atoms, aryl, alkaryl, aralkyl, and cycloalkyl and X is a halogen atom selected from the group consisting of chlorine, bromine and iodine and $n$ is an integer of from 1 to 3.

DETAILED DESCRIPTION

Polymers or resins which may be stabilized by practice of this invention are halogen-containing organic polymers typically those which contain chlorine atoms bonded to the polymer chain. These polymers include polyvinyl chloride-type polymers, e.g. polyvinyl chloride, polyvinylidene chloride, etc. They may also include copolymers formed by the copolymerization of vinyl chloride or vinylidene chloride with each other or with other ethylenically unsaturated monomers, Ethylenically unsaturated monomers may be compounds which contain polymerizable carbon-to-carbon double bonds and may include acrylates such as acrylic acid, ethyl acrylate, acrylonitrile, etc.; vinyl monomers such as styrene, vinyl acetate, etc.; maleates such as maleic acid, maleic anhydride, maleate esters, etc.

The polymers may be either "rigid" or "flexible". When "rigid" polymers are employed, they may include impact modifiers, pigments and/or fillers, lubricants, etc., in addition to the resin and stabilizer. When "flexible" polymers are employed, they may include plasticizer (primary and secondary), pigments and/or fillers, lubricants, etc., in addition to the resin and stabilizer.

In general the synthetic resins which can be stabilized according to this invention include the following polymers which may or may not be mixed with other stabilizers, additives, flameproofing agents, dyes, pigments, etc:

a. Homopolymer of vinyl chloride,
b. Homopolymer of vinylidene chloride,
c. Copolymers of vinyl chloride and acrylonitrile,
d. Copolymers of vinylidene chloride and acrylonitrile,
e. Copolymers of vinylidene chloride, acrylonitrile and N-isopropylacrylamide,
f. Copolymers of vinyl chloride and vinyl acetate,
g. Copolymers of vinyl chloride, acrylonitrile and N-butyrylacrylamide,
h. Copolymers of vinyl chloride, methyl methacrylate and vinyl acetate,
i. Copolymers of vinyl chloride or vinylidene chloride with acrylonitrile and N-vinylpyridine,
j. Copolymers of vinyl chloride or vinylidene chloride with acrylonitrile mixed with a homopolymer of an N-alkylacrylamide (e.g. N-isopropylacrylamide, N-octylacrylamide, etc.).
k. Copolymers of vinyl chloride or vinylidene chloride with acrylonitrile mixed with a homopolymer or copolymer of α-vinylpyrrolidone, l. Copolymers of vinyl chloride or vinylidene chloride with acrylonitrile mixed with copolymers of an N-alkylacrylamide and acrylonitrile.

m. Other copolymers and mixtures of homopolymers or copolymers of vinyl chloride and/or vinylidene chloride with or without other monoolefinically unsaturated polymerizable monomers containing from two to 20 or more carbon atoms, especially those containing from two to eight carbon atoms and no more than one nitrogen atom and no more than two oxygen atoms.

The methods for preparing the synthetic resins described above are well known and such methods and a great variety of such synthetic resins are described in the prior art. These synthetic resins are useful in preparing fibers, films, molding compositions, coating materials, wrapping materials, electrical insulation, fabrics, rope, plastic, pipe, paints, laminating materials for safety glass, adhesives, etc. Synthetic resins stabilized in accordance with this invention are especially advantageous in synthetic fibers and products made therefrom such as rugs, wearing apparel, draperies, seat covers, upholstery, rope, cigarette filters, etc. Resistance to weathering (e.g. moisture and ultraviolet light) is especially important for items exposed to out of doors conditions. Resistance to ultraviolet light is also important for rugs, draperies, automobile seat covers, porch furniture upholstery and the like which may receive considerable sunlight.

This invention is a novel stabilizing composition for stabilizing a vinyl chloride homopolymer or copolymer against the deteriorative effects of heat which comprises as a first stabilizer an organotin halide exhibiting the formula $RSnX_3$ wherein R is a hydrocarbon and X is a chlorine, bromine or iodine atom and as a second stabilizer a sulfur-containing organotin compound exhibiting a direct bond from tin to each of two sulfur atoms and two direct sulfur to tin bonds.

The first stabilizer operable in the practice of this invention is a compound of the formula $RSnX_3$. In this formula R is a hydrocarbon radical selected from the group consisting of alkyl, cycloalkyl, aralkyl, alkaryl, and aryl, and X is a halogen atom selected from the group consisting of chlorine, bromine and iodine. When R is alkyl, it may be a straight chain alkyl or a balanced alkyl, including methyl, ethyl, n-propyl; isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about eight carbon atoms, i.e. octyls and lower. When R is cycloalkyl, it may typically be cyclopentyl, cyclohexyl, cycloheptyl, cyclooctyl, etc. When R is aralkyl, it may be benzyl, β-phenylethyl, γ-phenylpropyl, β-phenylpropyl, etc. When R is aryl, it may typically be phenyl, naphthyl, etc. When R is alkaryl, it may typically be tolyl, xylyl, p-ethylphenyl, p-nonylphenyl, etc. R may be inertly substituted, e.g. may bear a non-reactive substituent such as alkyl, aryl, cycloalkyl, aralkyl, alkaryl, ether, etc. Typical substituted alkyls include 2-ethoxyethyl, etc. Substituted cycloalkyls include 4-methylcyclohexyl, etc. Inertly substituted aryl includes anisyl, biphenyl, etc. Inertly substituted aralkyl includes chlorobenzyl, p-phenylbenzyl, p-methylbenzyl, etc. Inertly substituted alkaryl includes 2,6-di-tert-butyl-4-methyl-phenyl, etc.

Specific examples of compounds exhibiting one direct carbon to tin bond and three direct halogen to tin bonds are monobutyltin trichloride, monooctyltin trichloride, monododecyltin trichloride, monophenyltin trichloride, etc.

Among the second stabilizers operable in the practice of this invention are compounds of the formula $R_2Sn(SR)_2$. In this formula R and R' are hydrocarbon radicals selected from the group consisting of alkyl, cycloalkyl, aralkyl, alkaryl, and aryl. R' may be selected from the same group as R. R' may also be a residue of a carboxylic acid ester - R''COOR'' . In these formulas R'', R''' (which may be the same as each other or different) may be selected from the same group as R and R' are selected from. Typical second stabilizers include dioctyltin bis(iso-octyl mercaptoacetate) and dibutylin bis (lauryl mercaptide).

Typical preferred second stabilizers include:
dibutyltin bis lauryl mercaptide
dibutyltin bis octyl mercaptide
dibutyltin bis benzyl mercaptide
dibutyltin bis xylyl mercaptide
dibutyltin bis cyclohexyl mercaptide
dibutyltin bis phenyl mercaptide
dioctyltin bis lauryl mercaptide
dioctyltin bis octyl mercaptide
dioctyltin bis benzyl mercaptide
dioctyltin bis xylyl mercaptide
dioctyltin bis cyclohexyl mercaptide
dicylohexyltin bis lauryl mercaptide
dimethyltin bis lauryl mercaptide
dimethyltin bis benzyl mercaptide
dimethyltin bis cyclohexyl mercaptide
dimethyltin bis xylyl di-mercaptide
dibutyltin bis iso-octyl mercaptoacetate
dioctyltin bis iso-octyl mercaptoacetate
dicyclohexyltin bis iso-octyl mercaptoacetate
dimethyltin bis iso-octyl mercaptoacetate
diphenyltin bis iso-octyl mercaptoacetate
dibutyltin bis lauryl mercaptoacetate
dibutyltin bis benzyl mercaptoacetate The preferred second stabilizer is dioctyltin bis (iso-octyl mercaptoacetate).

The first and second stabilizers are present in stabilizing amounts. Typically the first stabilizer is used in amount of 0.01 to 10 parts by weight of 100 parts by weight of halogen-containing, typically vinyl chloride, resins. Preferably it may be used in the amount of 0.05-2, preferably 0.3 parts per 100 parts of halogen-containing resin.

Typically the second stabilizer is present in amount of 0.1-10 parts per 100 parts by weight of halogen-containing resin. Preferably the amount used may be 1, say 2 parts per 100 parts of halogen-containing resin. Preferably the second stabilizer is present in an amount about 10 times the amount of the first stabilizer. Preferred results are achieved when the second stabilizer is present in amount of at least about twice that of the the first stabilizer.

Thus the preferred heat-stable vinyl chloride polymer compositions of this invention comprise 100 parts by weight of a vinyl chloride polymer; a stabilizing amount, typically 0.01-10 parts of a first stabilizer of the formula $RSnX_3$ having one direct halogen to tin bond and three direct carbon to tin bonds wherein R is selected from the group consisting of alkyl having one to 20 carbon atoms, aryl, alkaryl, aralkyl, and cycloalkyl; and a second stabilizer $R_2Sn(SR')_2$ wherein R is a hydrocarbon radical selected from the group consisting of alkyl, cycloalkyl, aralkyl, alkaryl, and aryl, R' may be a residue of a carboxylic acid ester or a radical selected from the same group as R.

The novel heat and light stable compositions of this invention may be formulated by such techniques as milling, dry blending, Banbury blending, or any other commonly employed formulating techniques.

One of the formulating methods which is particularly convenient is the addition of components of a stabilizer composition sequentially, the second stabilizer being added first, followed by the addition of the first stabilizer. This stabilizer composition is thoroughly mixed with, the vinyl chloride polymer. Where this technique is employed the stabilizer composition typically comprises stabilizing amounts of the stabilizers, typically 0.01 to 5 parts by weight of the first stabilizer and 0.1 to 10 parts by weight of the second stabilizer. Preferably, it comprises about 0.05 to 2, say 0.05 parts of the first stabilizer and about 0.5–4, say 1.8 parts of the second stabilizer. Preferably the second stabilizer may be present in an amount greater than the amount of the first stabilizer.

Whatever formulating technique be employed, it will be desirable to substantially complete and uniformly disperse the first stabilizer and the second stabilizer throughout the vinyl chloride polymer composition.

It is a feature of the novel stabilizer systems of this invention that it permits attainment of stabilized halogen-containing polymers and resins, particularly vinyl halide polymers such as vinyl chloride characterized by their resistance to the deteriorative effect of heat. The degrees of stabilization attained in such systems may be considerably in excess of that previously attainable by any prior art stabilizer system.

Because of the outstanding properties of this novel stabilizer system, it is possible to effect stabilization with lower quantities and thereby to obtain a more effective system on a cost-performance basis.

In order to set forth clearly the novel features of this invention and to illustrate the unexpected and outstanding results which may be attained by practice of this invention, the following illustrative examples may be set forth wherein all parts are parts by weight unless otherwise indicated.

EXAMPLE 1

The preferred illustrative first stabilizer employed was monooctyltin trichloride. The second stabilizer used was dioctyltin bis(iso-octyl mercaptoacetate). 100 parts of the vinyl chloride polymer was tested with addition of the stabilizer combination in the following amounts:

| | |
|---|---|
| vinyl chloride polymer | 100 parts |
| monooctyltin trichloride | 0.1 parts |
| dioctyltin bis(iso-octyl mercaptoacetate) | 1.9 parts |

In this example, the rigid vinyl chloride polymer employed was that having a specific viscosity (1 percent cyclohexanone at 30°C) - 1.10 and a specific gravity of 1.40, sold under the trademark "Diamond 40 Brand".

The results of the heat stability tests are as follows:

The foregoing composition was thoroughly blended by placing the polyvinyl chloride on a two-roller differential mill which was oil-heated to a temperature of 175°C. together with the noted quantity of first and second stabilizers, and the mixture was milled for about 5 minutes. A continuous band of the composition formed around one of the rollers. This band was cut and the composition was removed from the hot roller as a continuous sheet. Squares of this material measuring 2.54 cm × 2.54 cm were cut for heat stability testing.

For the heat stability test, the squares were placed in an air oven regulated to maintain a temperature of 190°C. Samples of each composition were removed from the oven at 15 minute intervals and were rated visually as to color change and degradation according to the following scale:

7 — clear, water-white
6 — off-white
5 — slightest degree of yellowing
4 — definite yellow color
3 — deep yellow-brown color
2 — deep brown color
1 — dark brown to black color The length of time in minutes required to reach a value of 3 or less was recorded as the Heat Stability Value.

Example 2 (CONTROL)

In control Example 2 the dioctyltin bis(isooctyl mercaptoacetate) was added in amount of 2 parts and no other stabilizer was present.

The results of the heat stability tests are as follows:

| Example | Heat Stability Value in Minutes | Color After Milling |
|---|---|---|
| 1 | 60 | 7 |
| 2(control) | 45 | 6 |

It will be apparent from an inspection of Examples 1 and 2 that the Heat Stability Value (H.S.V.) of the novel product of this invention is outstanding. The H.S.V. of this novel composition may be at least as long as 60 minutes. Furthermore, the Color After Milling of the novel product is 7, which (when considered together with the 60 minute H.S.V.) is outstandingly superior. Accordingly it will be apparent to those skilled in the art that practice of the novel process of this invention permits attainment of polymeric resins characterized by extremely high degree of heat stability. It is quite unexpected to be able to formulate a cheap composition and to obtain a stabilizer comparable with the best prior art stabilizers.

In further Examples, the Heat Stability Values and Color After Milling was determined for other preferred systems utilizing other stabilizers as follows:

EXAMPLE 3

| | |
|---|---|
| vinyl chloride polymer* | 100 parts |
| monooctyltin trichloride | 0.1 parts |
| di-n-octyltin S,S' bis(iso-octyl mercaptoacetate) | 1.9 parts |

*Diamond 40 brand of vinyl chloride polymer

EXAMPLE 4 (CONTROL)

| | |
|---|---|
| vinyl chloride polymer* | 100 parts |
| di-n-octyltin S,S' bis(iso-octyl mercaptoacetate) | 2.0 parts |

*Diamond 40 brand of vinyl chloride polymer

The results of the heat stability tests are presented in Table II as follows:

TABLE II

| Example | Heat Stability Value in Minutes | Color After Milling |
|---|---|---|
| 3 | 60 | 7 |
| 4 (control) | 45 | 6+ |

From Table II, it will be apparent that the H.S.V. (Heat Stability Value) of the novel stabilized system is one third longer than that of the control of Example 4; and the Color After Milling of the control was inferior to that of the experimental composition which was 7, clear, water-white.

Additional tests were performed with different vinyl chloride polymer, viz. a polymer having a specific gravity of 1.40, a Shore Durometer "D" hardness of 80, and an ultimate tensile strength of about 7,000 psi sold under the trademark Diamond-450. In the following Example 6, the resin composition included 0.1 parts of 2,6-di-tert-butyl para cresol. The oven temperature was maintained at 175°C. The formulations may be prepared as hereinafter set forth and the H.S.V. and Color After Milling determined as supra.

In control Example 5, the second stabilizer dibutyltin S,S' bis(iso-octyl mercaptoacetate) was added in amount of 2 parts and no other stabilizer was present.

EXAMPLE 5 (CONTROL)

| | |
|---|---|
| vinyl chloride polymer | 100 parts |
| di-n-butyltin bis(iso-octyl mercaptoacetate) | 2.0 parts |
| Heat Stability Value | 70 minutes |
| Color After Milling | 6 |

EXAMPLE 6

| | |
|---|---|
| vinyl chloride polymer | 100 parts |
| monobutyltin trichloride | 0.1 parts |
| dibutyltin bis(iso-octyl mercaptoacetate) | 1.8 parts |
| Heat Stability Value | 80 minutes |
| Color After Milling | 7 |

EXAMPLE 7

| | |
|---|---|
| vinyl chloride polymer* | 100 parts |
| monobutyltin trichloride | 0.1 parts |
| dibutyltin bis(iso-octyl mercaptoacetate) | 2.0 parts |
| Heat Stability Value | 80 minutes |
| Color After Milling | 7 |

*Diamond 450 Brand

It is apparent from Examples 6 and 7 that the Heat Stability Value (H.S.V.) of the novel product of this invention is outstanding. Furthermore, the Color After Milling of the novel product is very high, typically 7, which (when considered together with the high H.S.V. value) is outstandingly superior.

In further examples, the outstanding properties of these compositions may be observed.

In control Example 8, the second stabilizer was dibutyltin S,S' bis(iso-octyl mercaptoacetate) present in an amount of 1 part, and no other stabilizer was present.

EXAMPLE 8 (CONTROL)

| | |
|---|---|
| vinyl chloride polymer* | 100 parts |
| dibutyltin S,S' bis(iso-octyl mercaptoacetate) | 1.0 parts |
| Heat Stability Value | 40 minutes |
| Color After Milling | 6 |

*Diamond 450 Brand

EXAMPLE 9

| | |
|---|---|
| vinyl chloride polymer* | 100 |
| monobutyltin trichloride | 0.1 |
| dibutyltin S,S' bis(iso-octyl mercaptoacetate) | 1.0 |
| Heat Stability Value | 50 minutes |
| Color After Milling | 5 |

*Diamond 450 Brand

EXAMPLE 10

| | |
|---|---|
| vinyl chloride polymer* | 100 |
| butyltin trichloride | 0.3 |
| dibutyltin S,S' bis(iso-octyl mercaptoacetate) | 1.0 |
| Heat Stability Value | 40 minutes |
| Color After Milling | 7 |

*Diamond 450 Brand

It will be apparent from an inspection of Examples 6, 7, 9 and 10 that the Heat Stability Value (H.S.V.) of the novel product of this invention is outstanding. The H.S.V. of this novel composition may be, for example, as long as 80 minutes. Furthermore, the Color After Milling of the novel product is 7, which (when considered together with the 80 minute H.S.V.) is outstandingly superior.

In still further Examples 11 and 12, polyvinyl chloride sheets 1.5 millimeters thick were prepared by milling compositions on a two-roller differential mill which was oil-heated to a temperature of 163°C. together with the noted quantity of first and second stabilizers, and the mixture was milled for about 5 minutes. A continuous band of the composition formed around one of the rollers. This band was cut and the composition was removed from the hot roller as a continuous sheet. The milled sheets were cut to size and pressed into samples 1 millimeter thick under a pressure of 50,000 pounds per square inch and at a temperature of 186°C.

Samples of each composition were rated visually as to color change and degradation.

EXAMPLE 11

| | |
|---|---|
| vinyl chloride polymer* | 100 parts |
| monobutyltin trichloride | 0.1 parts |
| dibutyltin S,S' bis(lauryl mercaptide) | 1.9 parts |

*Diamond 450 Brand

In control Example 12 the second stabilizer dibutyltin S,S' bis(lauryl mercaptide) in an amount of 2.0 parts and no other stabilizer was present.

EXAMPLE 12 (CONTROL)

| | |
|---|---|
| vinyl chloride polymer* | 100 parts |
| dibutyltin S,S' bis(lauryl mercaptide) | 2.0 parts |

*Diamond 450 Brand

The color after pressing of the composition of Example 11 was a clear, water-white, while that of the control was decidedly yellow in appearance.

Although this invention has been illustrated by reference to specific examples, changes therein which clearly fall within the scope of the invention will be apparent to those skilled in the art. It is, therefore, to be limited solely by the scope of the appended claims.

I claim:

1. A novel stabilizing composition for stabilizing a vinyl chloride homopolymer or a copolymer of vinyl chloride with a suitable ethylenically unsaturated monomer against the deteriorative effect of heat which comprises as a first stabilizer an organotin halide exhibiting the formula $RSnX_3$ wherein R is a monovalent hydrocarbon radical selected from the group consisting of alkyl having one to 20 carbon atoms, aryl, alkaryl, aralkyl, and cycloalkyl and X is a halogen atom selected from the group consisting of chlorine and bromine and as a second stabilizer an organotin compound exhibiting the formula $R'_2Sn(SR'')_2$ wherein R' is a monovalent hydrocarbon radical selected from the same group as R and R'' is a monovalent hydrocarbon radical selected from the same group as R or the group $-CH_2COOR'''$ wherein R''' is a hydrocarbon selected from the group consisting of alkyl having one to 20 carbon atoms, aryl, cycloalkyl, aralkyl, and alkaryl.

2. The stabilizing composition of claim 1 wherein said second stabilizer is of the formula $R'_2Sn(SCH_2COOR'':)_2$ wherein R' and R''' are hydrocarbons selected from the group consisting of alkyl having one to 20 carbon atoms, aryl, cycloalkyl, aralkyl, and alkaryl.

3. The stabilizing composition of claim 1 wherein said second stabilizer is dioctyltin bis(iso-octyl mercaptoacetate).

4. A novel halogen-containing polymer stabilized against the deteriorative effect of heat comprising a halogen-containing resin selected from the group consisting of vinyl chloride homopolymer and copolymers of vinyl chloride with suitable ethylenically unsaturated monomers and a stabilizing amount of as a first stabilizer an organotin trihalide exhibiting the formula $RSnX_3$ wherein R is a monovalent hydrocarbon radical selected from the group consisting of alkyl having one to 20 carbon atoms, aryl, alkaryl and cycloalkyl and X is a halogen atom selected from the group consisting of chlorine and bromine and a second stabilizer exhibiting the formula $R'_2Sn(SR'')_2$ wherein R' is a monovalent hydrocarbon radical selected from the same group as R and R' is a monovalent hydrocarbon radical selected from the same group as R or the group $-CH_2COOR'''$ wherein R''' is a hydrocarbon selected from the group consisting of alkyl having one to 20 carbon atoms, aryl, cycloalkyl, aralkyl, and alkaryl.

5. A novel halogen-containing polymer stabilized against the deteriorative effect of heat as claimed in claim 4 wherein said second stabilizer is of the formula $R'_2Sna(SCH_2COOR''')_2$ wherein R' and R''' are hydrocarbons selected from the group consisting of alkyl having one to 20 carbon atoms, aryl, cycloalkyl, aralkyl and alkaryl.

6. A novel halogen-containing polymer stabilized against the deteriorative effect of heat as claimed in claim 4 wherein said second stabilizer is dioctyltin bis(iso-octyl mercaptoacetate).

* * * * *

UNITED STATES PATENT OFFICE
CERTIFICATE OF CORRECTION

Patent No. 3,715,333     Dated 2/6/73

Inventor(s) William A. Larkin

It is certified that error appears in the above-identified patent and that said Letters Patent are hereby corrected as shown below:

Page 1, right hand column, line 3 - "Vi Piltoke" should read -- V. P. Hoke --.

Column 2 line 13 - Delete "and n is an integer of from 1 to 3"

Column 4 line 8 - "$R_2Sn(SR)_2$" should read -- $R_2Sn(SR')_2$ --.

Claim 5 line 4 - "$R'_2Sna(SCH_2COOR''')_2$" should read -- $R'_2Sn(SCH_2COOR''')_2$ --.

Signed and sealed this 19th day of March 1974.

(SEAL)
Attest:

EDWARD M. FLETCHER, JR.
Attesting Officer

C. MARSHALL DANN
Commissioner of Patents